(12) United States Patent
Lim et al.

(10) Patent No.: US 11,875,003 B2
(45) Date of Patent: Jan. 16, 2024

(54) ELECTRONIC DEVICE AND METHOD FOR CONTROLLING DIGITIZER PANEL OF ELECTRONIC DEVICE ON BASIS OF STATE OF ELECTRONIC PEN

(71) Applicant: Samsung Electronics Co., Ltd., Gyeonggi-do (KR)

(72) Inventors: Chaehoon Lim, Gyeonggi-do (KR); Dusun Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/573,861

(22) Filed: Jan. 12, 2022

(65) Prior Publication Data
US 2022/0137746 A1 May 5, 2022

Related U.S. Application Data

(63) Continuation of application No. PCT/KR2020/009427, filed on Jul. 17, 2020.

(30) Foreign Application Priority Data
Jul. 26, 2019 (KR) .................. 10-2019-0091291

(51) Int. Cl.
*G06F 3/044* (2006.01)
*H04B 17/318* (2015.01)
(Continued)

(52) U.S. Cl.
CPC ........ *G06F 3/0441* (2019.05); *G06F 3/03545* (2013.01); *G06F 3/0442* (2019.05); *G06F 3/04162* (2019.05); *H04B 17/318* (2015.01)

(58) Field of Classification Search
CPC ...... G06F 1/1626; G06F 1/1643; G06F 1/266; G06F 1/3215; G06F 1/3262;
(Continued)

(56) References Cited

U.S. PATENT DOCUMENTS 10,073,548 B2   9/2018  Fleck
10,509,492 B2  12/2019  Zhang et al.
(Continued)

FOREIGN PATENT DOCUMENTS

JP   09-152932 A   6/1997
JP   2009-80745 A  4/2009
(Continued)

OTHER PUBLICATIONS

European Search Report dated Jul. 13, 2022.

*Primary Examiner* — Chun-Nan Lin
(74) *Attorney, Agent, or Firm* — Cha & Reiter, LLC

(57) ABSTRACT

An electronic device and method are disclosed. The electronic device includes a communication circuit, a sensor circuit, a digitizer panel, and a processor. The processor implements the method, including: detecting whether an electronic pen is detached from the electronic device via the sensor circuit, activating the digitizer panel based on detecting detachment of the electronic pen from the electronic device, identifying a state of the electronic pen through a communication linkage with the electronic pen via the communication circuit, and deactivate the activated digitizer panel based on the identified state of the electronic pen.

15 Claims, 9 Drawing Sheets

(51) Int. Cl.
*G06F 3/041* (2006.01)
*G06F 3/0354* (2013.01)

(58) Field of Classification Search
CPC .............. G06F 1/3278; G06F 1/3287; G06F 2200/1632; G06F 2203/04106; G06F 3/03545; G06F 3/04162; G06F 3/0441; G06F 3/0442; H04B 17/318; Y02D 10/00
See application file for complete search history.

(56) References Cited

U.S. PATENT DOCUMENTS

| | | | |
|---|---|---|---|
| 2006/0174139 A1* | 8/2006 | Keely | G06F 3/03545 713/300 |
| 2011/0012849 A1 | 1/2011 | Cho et al. | |
| 2015/0002425 A1 | 1/2015 | Lee et al. | |
| 2015/0099486 A1 | 4/2015 | Choi et al. | |
| 2015/0185800 A1* | 7/2015 | Narayanan | G06F 1/3287 345/173 |
| 2017/0115755 A1 | 4/2017 | Jung et al. | |
| 2017/0322642 A1* | 11/2017 | Zhang | G06F 3/0484 |
| 2017/0351355 A1* | 12/2017 | Hsieh | G06F 3/0412 |
| 2018/0032160 A1* | 2/2018 | Park | G06F 3/03545 |
| 2018/0032163 A1* | 2/2018 | Park | B43K 24/02 |
| 2019/0042006 A1 | 2/2019 | Hsieh et al. | |

FOREIGN PATENT DOCUMENTS

| | | |
|---|---|---|
| JP | 2018-77826 A | 5/2018 |
| KR | 1997-0008515 B1 | 5/1997 |
| KR | 10-2005-0013315 A | 2/2005 |
| KR | 10-2011-0006926 A | 1/2011 |
| KR | 10-2014-0077000 A | 6/2014 |
| KR | 10-2016-0047385 A | 5/2016 |
| KR | 10-2016-0148959 A | 12/2016 |
| KR | 10-2017-0069616 A | 6/2017 |

* cited by examiner

ELECTRONIC DEVICE AND METHOD FOR CONTROLLING DIGITIZER PANEL OF ELECTRONIC DEVICE ON BASIS OF STATE OF ELECTRONIC PEN

CROSS-REFERENCE TO RELATED APPLICATION(S)

This application is a continuation of International Application No. PCT/KR2020/009427, filed on Jul. 17, 2020, which claims priority to Korean Patent Application No. 10-2019-0091291 filed on Jul. 26, 2019 in the Korean Intellectual Property Office, the disclosures of which are herein incorporated by reference.

TECHNICAL FIELD

Certain embodiments of the disclosure relate to controlling an electronic device, and, more particular, to controlling a digitizer panel based on a state of an external device.

BACKGROUND

An electronic device may receive a user input through a touchscreen. Touch screen functionality may also be supplemented by external devices, such as an electronic stylus, which allow a user to generate even more precise touch inputs (including both contact-based inputs and hover-based input). The electronic stylus is often mountable to the electronic device, either by attachment to a predesignated external surface thereof, or stowable into a compartment within the electronic device itself When an electronic pen is detached from an electronic device, there may be periods in which the electronic stylus is not actively used. For example, the electronic pen may be rested on a table while the user operates the device using other inputs. Oftentimes, a corresponding digitizer panel is maintained in an activated state even though the electronic stylus is not in use. This results in unnecessary current consumption.

SUMMARY

An electronic device according to certain embodiments of the disclosure can control activation and deactivation of a digitizer panel based on various states of the electronic stylus, such as, for example, whether the electronic pen is mounted or dismounted from the electronic device, and furthermore various states of the electronic pen itself.

An electronic device according to certain embodiments of the disclosure may include: a communication circuit; a sensor circuit; a digitizer panel; and a processor operatively connected to the communication circuit, the sensor circuit, and the digitizer panel, wherein the processor is configured to: detect whether an electronic pen is detached from the electronic device via the sensor circuit, activate the digitizer panel based on detecting detachment of the electronic pen from the electronic device, identify a state of the electronic pen through a communication linkage with the electronic pen via the communication circuit, and deactivate the activated digitizer panel based on the identified state of the electronic pen.

An electronic device according to various embodiments of the disclosure may include: a communication circuit; a sensor circuit; a digitizer panel; and a processor operatively connected to the communication circuit, the sensor circuit, and the digitizer panel, wherein the processor is configured to: detect whether an electronic pen is detached from the electronic device through the sensor circuit, control the digitizer panel to be activated in case that detachment of the electronic pen from the electronic device is detected, perform communication with the electronic pen through the communication circuit, identify whether a state of the electronic pen is received from the electronic pen through the communication circuit, and control the activated digitizer panel to be deactivated in case that the state of the electronic pen is not received.

A method for controlling a digitizer panel based on a state of an electronic pen of an electronic device according to certain embodiments of the disclosure may include:

A method for controlling a digitizer panel based on a state of an electronic pen of an electronic device according to certain embodiments of the disclosure may include: detecting whether an electronic pen is detached from the electronic device via a sensor circuit, activating, by at least one processor, a digitizer panel based on detecting detachment of the electronic pen from the electronic device, identifying a state of the electronic pen while maintaining a communication linkage with the electronic pen via a communication circuit, and deactivating the activated digitizer panel based on the identified state of the electronic pen.

The electronic device according to the certain embodiments of the disclosure can deactivate the digitizer panel based on a variety of detected states of the electronic stylus. For example, consideration can be made as to whether the stylus is detached from the device, the status of the stylus itself (e.g., activation/deactivation), a distance between the stylus and the device, movement of the stylus, etc. Based on one or more detected characteristics of the stylus as indicated above, it can be determined whether the electronic pen is in use, and according to that determination, the electronic device can in some cases deactivate the digitizer panel, and thus reduce current consumption of the electronic device. Accordingly, the usage time of the electronic device can also be increased. Further, since the deactivation is performed when the stylus is determined to be passive and not in active user by the user, the user suffers no inconvenience and benefits by the power savings.

DETAILED DESCRIPTION

Figure 1:
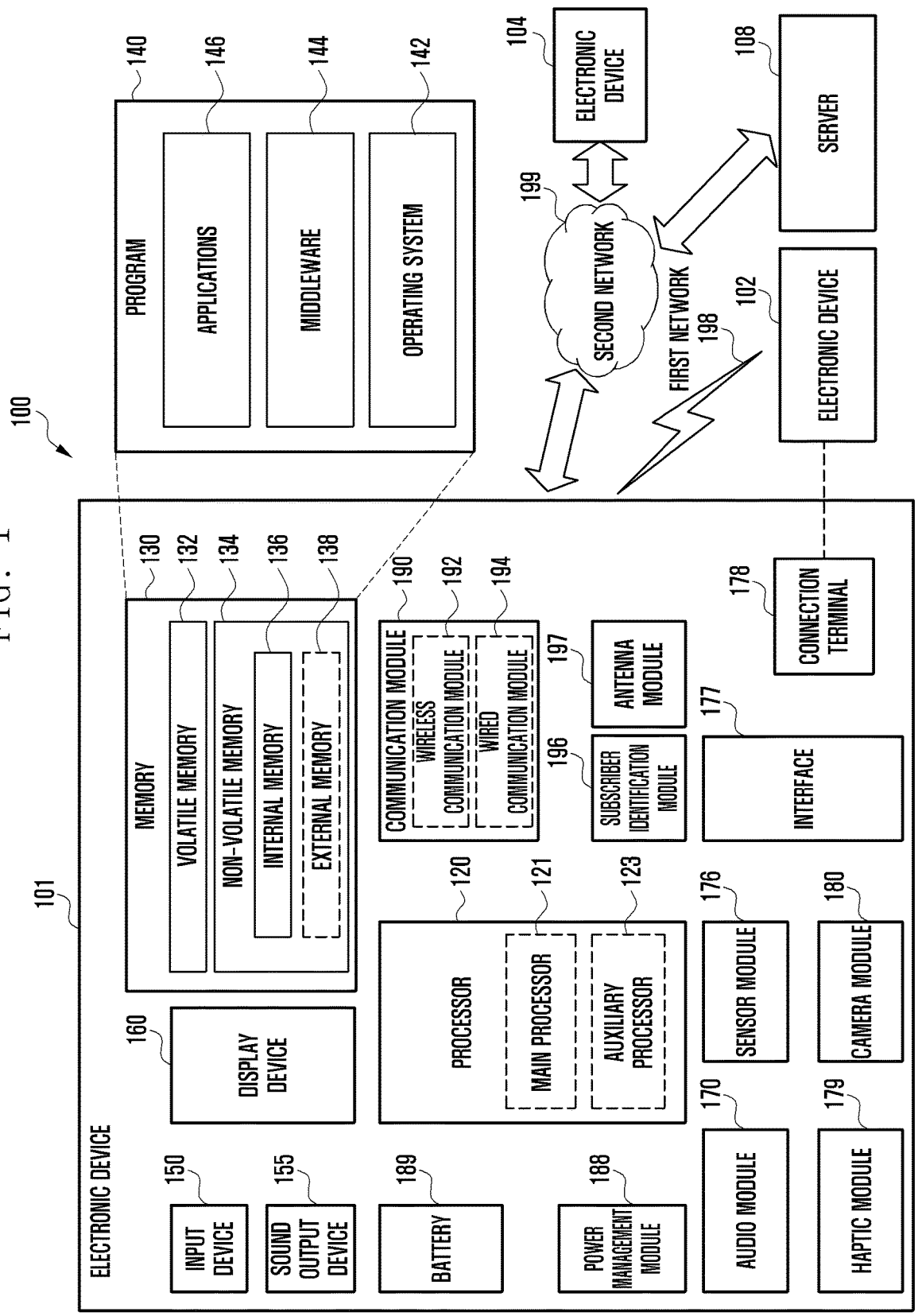
FIG. 1 is a block diagram of an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
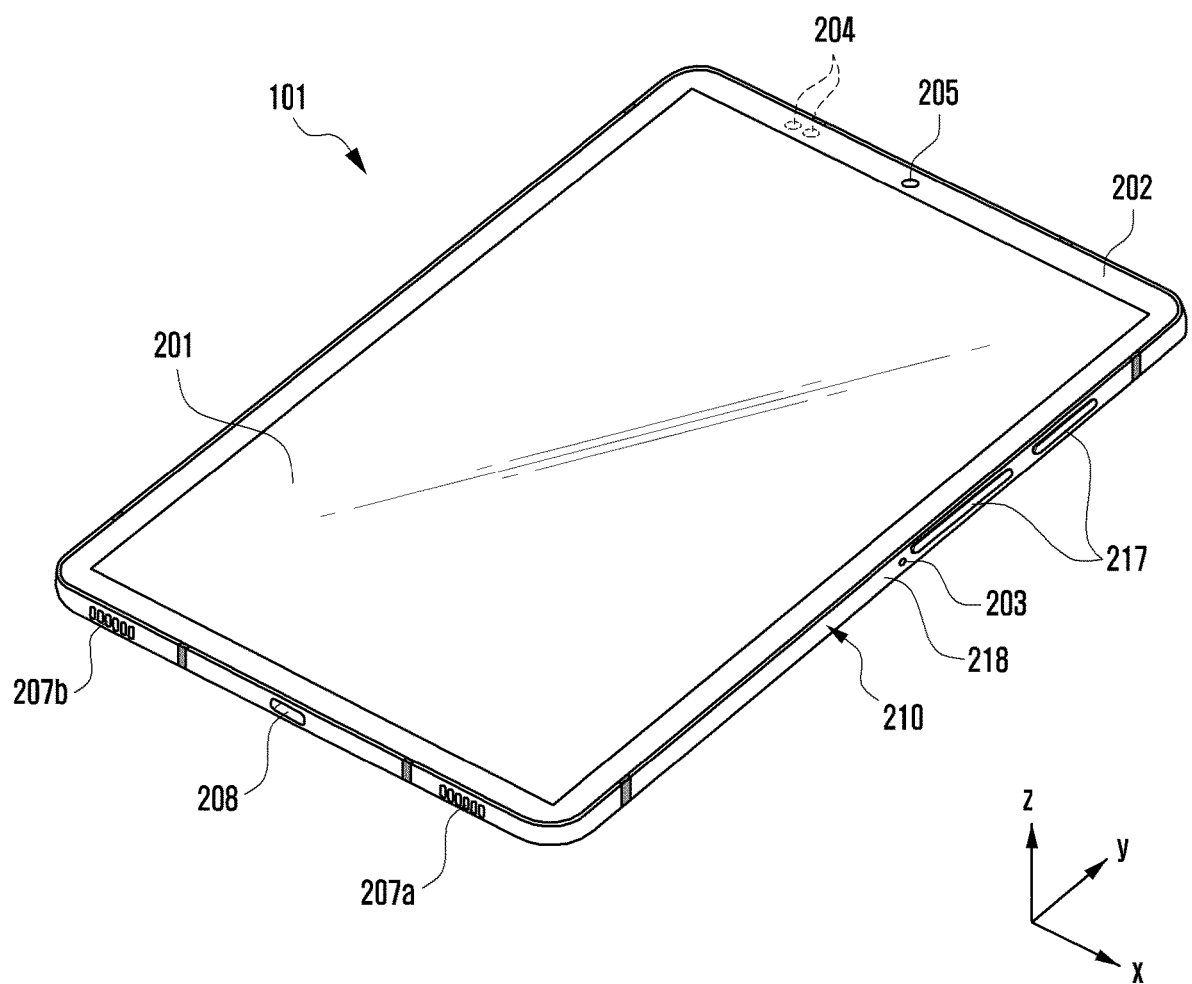
FIG. 2 is a front perspective view of an electronic device according to certain embodiments.
Figure 3:
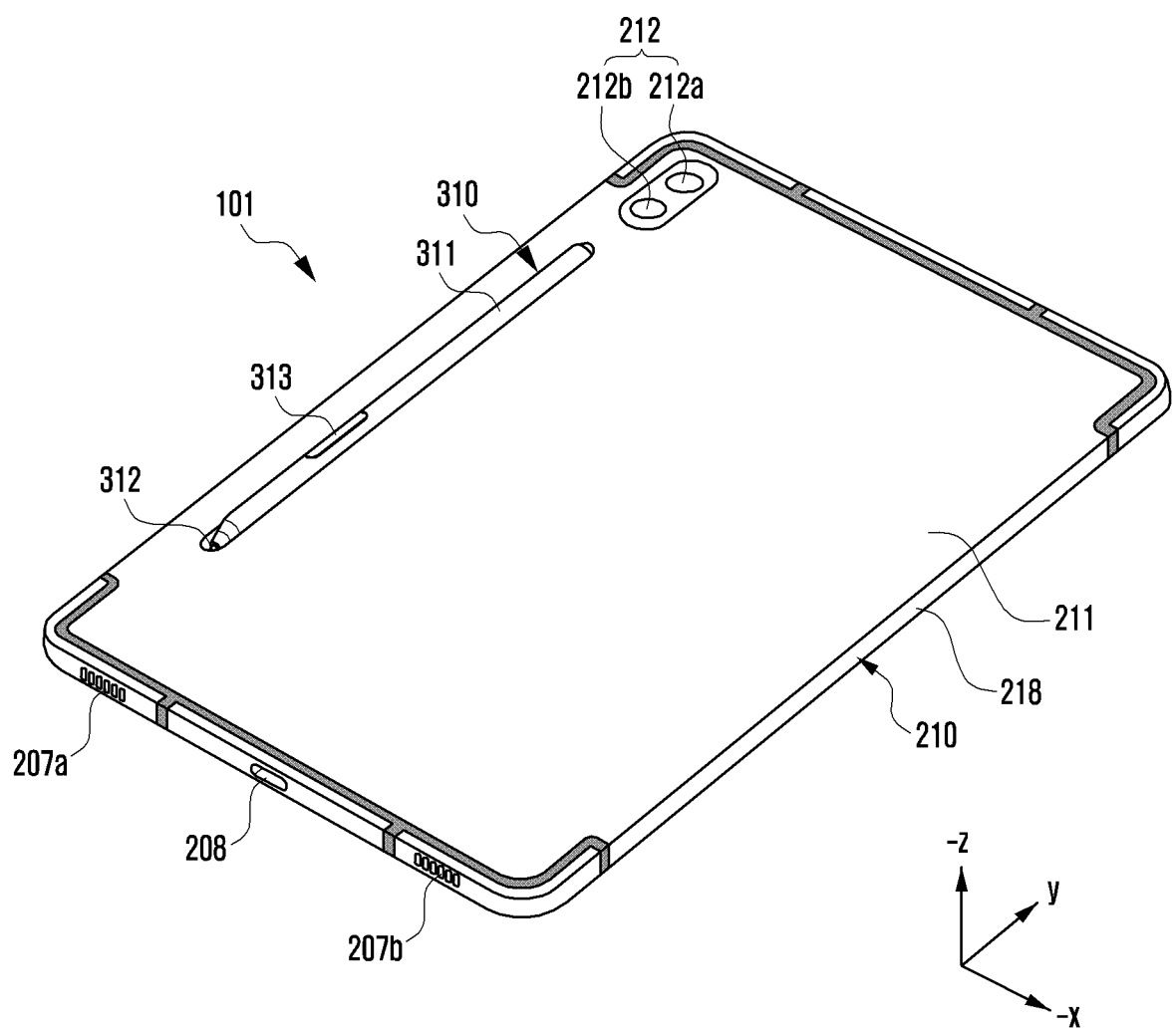
FIG. 3 is a rear perspective view of the electronic device of FIG. 2 in a state where an electronic pen is mounted on the electronic device according to certain embodiments.
Figure 4:
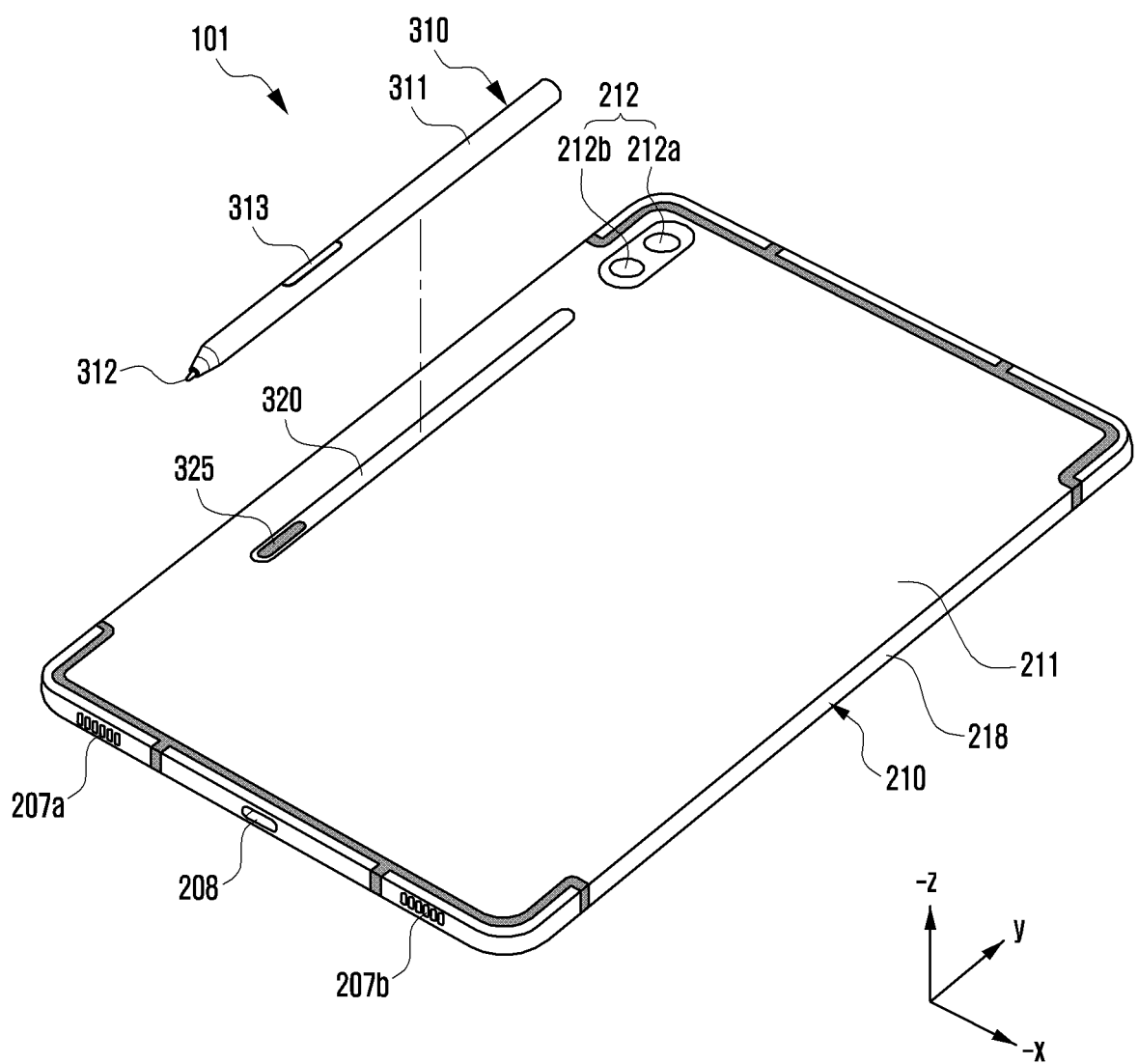
FIG. 4 is a rear perspective view of the electronic device of FIG. 2 in a state where an electronic pen is detached from the electronic device according to certain embodiments.

FIG. 2 is a front perspective view of an electronic device 101 according to certain embodiments. FIG. 3 is a rear perspective view of the electronic device of FIG. 2 in a state where an electronic pen 310 is mounted on the electronic device 101 according to certain embodiments. FIG. 4 is a rear perspective view of the electronic device 101 of FIG. 2 in a state where an electronic pen 310 is detached from the electronic device according to certain embodiments.

Referring to FIGS. 2, 3, and 4, the electronic device 101 may include a housing 210 that includes a front plate 202 facing a first direction (i.e., a positive direction of the Z-axis), a rear plate 211 facing a direction (i.e., a negative direction of the Z-axis) opposite to the first direction, and a lateral member 218 surrounding an inner space defined between the front plate 202 and the rear plate 211. The front plate 202 (e.g., a glass plate or polymer plate coated with a variety of coating layers) at least a part of which is substantially transparent. The rear plate 211 may be formed of, for example, coated or colored glass, ceramic, polymer, metal (e.g., aluminum, stainless steel (STS), or magnesium), or any combination thereof. The lateral member 218 may be combined with the front plate 202 and the rear plate 211, and may further include a metal and/or polymer. The rear plate 211 and the lateral member 218 may be integrally formed and may be formed of the same material (e.g., a metallic material such as aluminum).

The electronic device 101 may include a display 201 (e.g., display device 160 of FIG. 1), audio modules 203, 207a, and 207b (e.g., an audio module 170 of FIG. 1), a sensor module 204 (e.g., a sensor module 176 of FIG. 1), camera modules 205 and 212 (212a and 112b) (e.g., a camera module 180 of FIG. 1), a key input device 217 (e.g., an input device 150 of FIG. 1), and/or a connector hole 208. In some embodiments, the electronic device 101 may omit at least one of the above-listed components (e.g., the key input device 217) or further include any other component.

The display 201 may be exposed through a considerable portion of the front plate 202. In another embodiment, the display 201 may be exposed through the substantially entire area of front plate 202. In still another embodiment, edges and corners of the display 201 may be formed to substantially resemble adjacent outlines of the front plate 202. In yet another embodiment, in order to expand an exposed area of the display 201, a gap between edges of the display 201 and corresponding edges of the front plate 202 may be substantially consistent across the seam between the display 201 and the front plate 202.

In further another embodiment, a recess or opening may be formed in a portion of a display area of the display 201 to accommodate at least one of the sensor module 204 and the camera module 205. At least one of the sensor module 204, the camera module 205, and a fingerprint sensor (not shown) may also be disposed on the back of the display area of the display 201. The display 201 may be combined with, or disposed adjacent to, a touch sensing circuit, a pressure sensor capable of measuring the touch strength (pressure), and/or a digitizer for detecting a stylus pen.

The audio modules 203, 207a and 207b may correspond to a microphone hole 203 and speaker holes 207a and 107b, respectively. The microphone hole 203 may house a microphone disposed therein for acquiring external sounds and, in an embodiment, include a plurality of microphones to detect a sound directionality. The speaker holes 207a and 207b may include an external speaker hole and/or a call receiver hole. The microphone hole 203 and the speaker holes 207a and 207b may be implemented as a single hole, or a speaker (e.g., a piezo speaker) may be provided without the speaker holes 207a and 207b.

The sensor module 204 may generate an electrical signal or data value corresponding to an internal operating state or external environmental state of the electronic device 101. The sensor module 204 may include at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor.

The camera modules 205 and 212 (e.g., which may in turn include 212a and 112b) may include a first camera module 205 disposed to be visually exposed to the external environment through the front plate 202 of the electronic device 101, and second camera module 212 (212a and 112b) visually disposed to be external environment to the outside through the rear plate 211. According to an embodiment, the camera modules 205 and 212 may include one or a plurality of lenses, an image sensor, and/or an image signal processor. According to an embodiment, the rear camera modules 212a and 212b may be disposed adjacent to each other, and may thus be considered as one single camera module assembly 212. For example, a pair of the camera modules 212a and 212b in the camera module assembly 212 may perform a multiple camera functions, such as, for example general shooting (e.g., a "normal" angle shot), wide-angle shooting, and/or ultra-wide-angle shooting.

The key input device 217 may be disposed through the lateral member 218 of the housing 210. In a certain embodiment, some or all of the key input device 217 may be implemented in the form of a soft key displayed on the display 201. In another embodiment, the key input device 217 may be implemented using a pressure sensor included in the display 201. In still another embodiment, the key input device 217 may include at least one pressure-sensitive key (e.g., via a strain gauge) disposed in the electronic device 101, which may be capable of detecting pressure changes for pressure applied to the lateral member 218.

According to an embodiment, the connector hole 208 may accommodate a connector (e.g., a USB connector or an IF connector) for transmitting and receiving power, data, and/or sound signals to and from an external electronic device (e.g., the electronic devices 102 and 104, the server 108 of FIG. 1).

In an embodiment, a rear plate 211 of an electronic device 101 may include a pen seat part 320 provided in at least a partial area thereof, enabling an electronic pen 310 to be secured to the rear of the electronic device 101. At least a partial area of the pen seat part 320 may further include a wireless charging circuit 325 for charging a battery of the electronic pen 310 when mounted thereon.

In an embodiment, the electronic pen 310, as disposed to be able to be mounted on the pen seat part 320 provided in the at least a partial area of the rear plate 211 of the electronic device 101, may be included. In an embodiment, the electronic pen 310 may include a hollow type pen housing 311 having a length and a pen tip 312 disposed at an end part of the pen housing 311. The pen tip 312 may include an electrode, and based on a change of capacitance inside a digitizer panel (not illustrated) caused by an electrode access, the input position of the electronic pen 210 on the display 201 may be detected. In an embodiment, the electronic pen 310 may include a button 313 disposed in at least a partial area of the pen housing 311. In an embodiment, the electronic pen 310 may be mounted on the pen seat part 320 using a magnetic force of a magnet. In an embodiment, the electronic pen 310 may include a battery (not illustrated) disposed inside the pen housing 311 and used for short-range wireless communication (e.g., Bluetooth low energy (BLE) communication). In an embodiment, the electronic pen 310 may include a coil member for electromagnetic induction and/or wireless charging, and using the coil member, the battery (not illustrated) may be charged through a wireless charging circuit 325 disposed in the pen seat part 320 of the electronic device 101. In an embodiment, the electronic pen 310 may include an electromagnetic resonance (EMR) type, an active electrical stylus (AES) type, or an electric coupled resonance (ECR) type.

In an embodiment, as illustrated in FIG. 3, if the electronic pen 310 is mounted on the pen seat part 320 provided in the partial area of the rear plate 211 of the electronic device 101, the digitizer panel (not illustrated) may be in a deactivated state. If the electronic pen 310 mounted on the pen seat part 320 provided in the partial area of the rear plate 211 of the electronic device 101 is detached from the pen seat part 320 as illustrated in FIG. 4, the digitizer panel (not illustrated) may be switched to an activated state.

In certain embodiments, it has been explained that the electronic pen 301 is mounted on the pen seat part 320 provided in the partial area of the rear plate 211 of the electronic device 101, but the mounting of the electronic pen 301 is not limited thereto.

Figure 5:
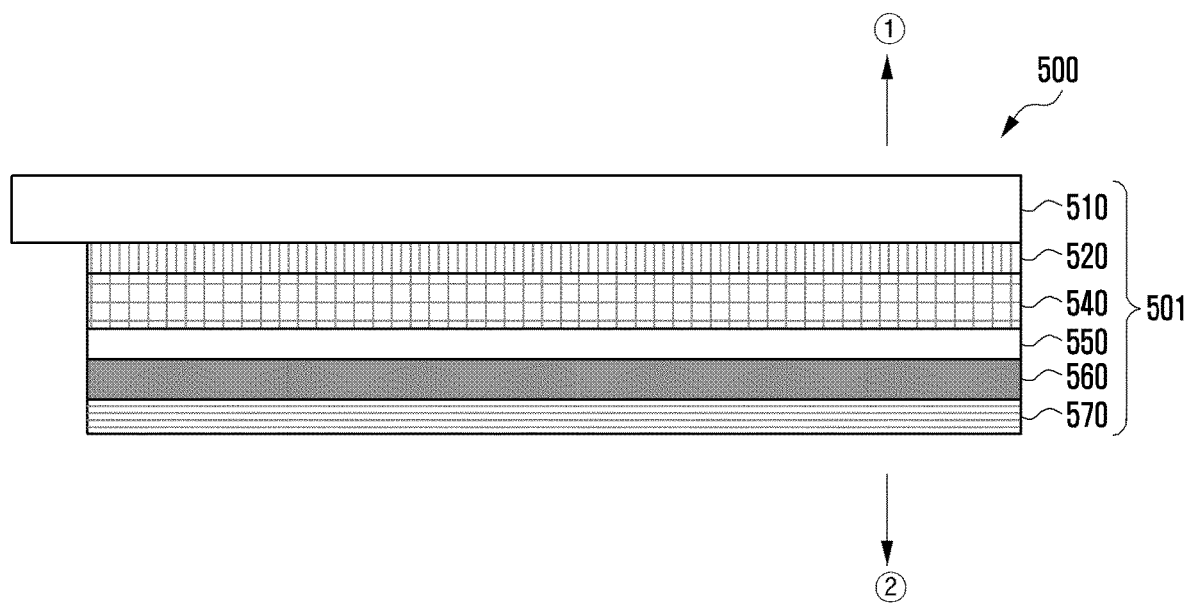
FIG. 5 is a diagram illustrating a laminated structure of a display according to certain embodiments.

FIG. 5 is a diagram 500 illustrating a laminated structure of a display 501 according to certain embodiments.

With reference to FIG. 5, the display 501 may include a plurality of layers laminated on each other. For example, the display 501 may include a window layer 510, a touch sensor layer 520, a display panel 540, a protection film 550, a cushion layer 560, and a digitizer panel 570.

The display 501 according to an embodiment may be at least partly similar to the display device 160 of FIG. 1 and/or the display 201 of FIG. 2.

In an embodiment, the window layer 510 may mean a front plate (e.g., front plate 202 of FIG. 2). The window layer 510 may be disposed to be directed in a first direction ①. The window layer 510 may protect a display panel 540 in the display 501 against an external impact or a scratch. The window layer 510 may be formed of a transparent material. The window layer 510 may penetrate light inside and outside the electronic device (e.g., electronic device 101 of FIG. 1). The window layer 510 may be a cover glass formed of a tempered glass, reinforced plastic, or flexible polymer material. In an embodiment, the window 510 may include a polyimide window.

In an embodiment, the touch sensor layer 520 may be disposed on a rear surface of the window layer 510. For example, the rear surface may mean a surface that is directed in a second direction ②. The touch sensor layer 520 may detect a touch signal input through the window layer 510. The touch sensor layer 520 may include a capacitive overlay type, resistive overlay type, or infrared beam type touch sensor, or may include a pressure sensor. In addition to the above-described sensors, various sensors capable of sensing an object contact or pressure may be included in the touch sensor layer 520.

In an embodiment, the display panel 540 may be disposed on the rear surface (e.g., second direction ②) of the touch sensor layer 520. In an embodiment, the display panel 540 may include a light-emitting area for outputting an image. In an embodiment, the display panel 540 may be electrically connected to a display control circuit. The display control circuit may include a display driver IC (DDI) and/or a touch display driver IC (TDDI) disposed in a chip on panel (COP) type or a chip on film (COF) type. The display control circuit may be included in the display panel 540, and may be located in a side area of the light-emitting area (e.g., display active area) of the display panel 540 or in an area in which a part of the display panel 540 is bent toward the rear surface of the display panel 540. The display panel 540 may receive a power supply and may emit light under the control of the display control circuit.

In an embodiment, the display panel 540 may cause display of a specific image by emitting light of red, green, or blue colors in accordance with a driving signal of the display 501.

In an embodiment, the protection film 550 may be adhered to the rear surface (e.g., second direction ②) of the touchscreen panel 540. The protection film 550 may physically support the window layer 510, the touch sensor layer 520, and the display panel 540 disposed on an upper part thereof.

In an embodiment, the cushion layer 560 may absorb impacts from being fully transferred to constituent elements (e.g., components located in the housing (e.g., housing 210 of FIG. 2) of the electronic device 101, and may be located at a lower part of the display 501) disposed at a lower end of the display 501, due to a force applied from an outside of the electronic device 101 through the window layer 510 (e.g., force being applied while a user of the electronic device 101 performs a touch input). The cushion layer 560 may include various materials, such as plastic, carbon nanoparticles, or polyurethane. On the rear surface (e.g., second direction (②))) of the cushion layer 560, for example, the digitizer panel 570 may be disposed.

In an embodiment, the digitizer panel 570 may identify various types of information including coordinates corresponding to the location of the electronic pen 310, a slope of the electronic pen 310, and/or pressure. For example, the digitizer panel 570 may receive an electromagnetic signal using a plurality of patterns formed of a conductor disposed on the digitizer panel 570. The electromagnetic signal may be output from the electronic pen 310. The digitizer panel 570 may detect the change of a magnetic field generated by the electromagnetic signal transmitted from the electronic pen 310. The digitizer panel 570 may identify various kinds of information, such as the location, pressure, and/or slope state of the electronic pen 310 on the display 501 based on the change of the magnetic field.

In certain embodiments, it has been explained that the digitizer panel 570 is disposed on the rear surface (e.g., second direction (②))) of the cushion layer 560, but the disposition of the digitizer panel 570 is not limited thereto. For example, the digitizer panel 570 may be disposed on an upper surface (e.g., first direction (①))) of the cushion layer 560.

In an embodiment, each of the plurality of layers is laminated on each other in the display 501, and may be attached to each other using an adhesive. The adhesive may include an optically clear resin (OCR), pressure sensitive adhesive (PSA), optical clear adhesive (OPA), thermal adhesive, general adhesive, or double-sided tape.

In FIG. 5, the laminated structure of the display 501 according to certain embodiments is not limited to an embodiment, but may include various laminated structures.

Figure 6:
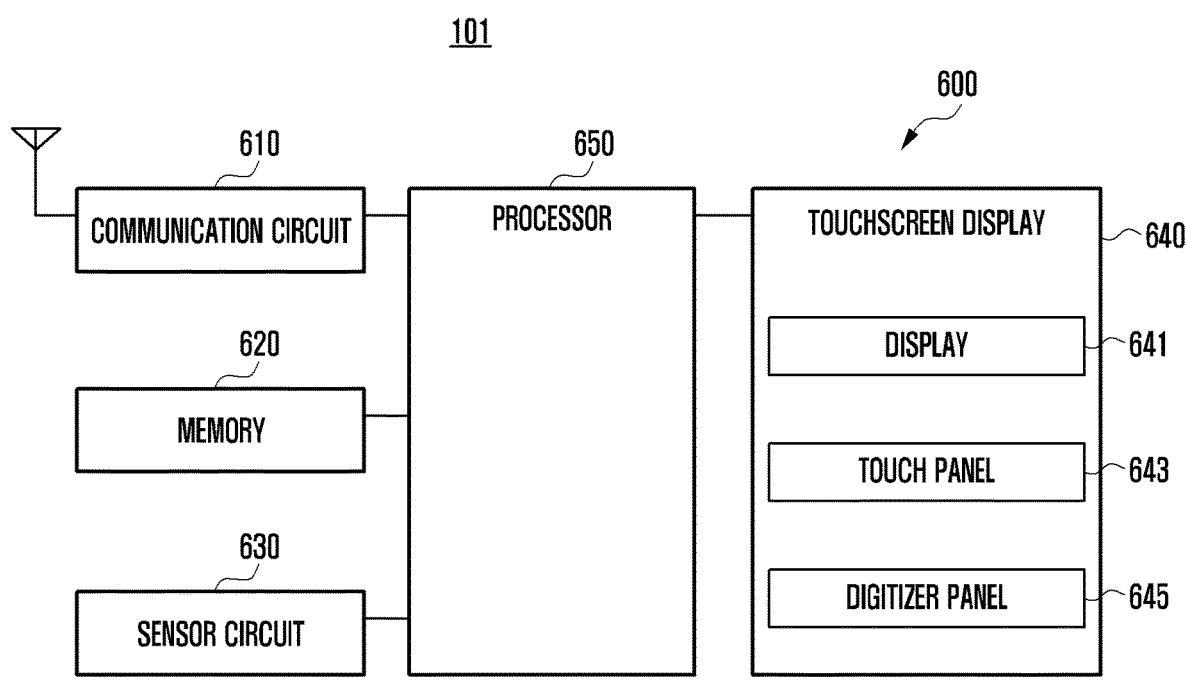
FIG. 6 is a block diagram illustrating an electronic device according to certain embodiments.

FIG. 6 is a block diagram 600 illustrating an electronic device 101 according to certain embodiments.

With reference to FIG. 6, an electronic device 101 may include a communication circuit 610 (e.g., communication module 190 of FIG. 1), a memory 620 (e.g., memory 130 of FIG. 1), a sensor circuit 630, a touchscreen display 640 (e.g., display device 160 of FIG. 1 or display 501 of FIG. 5), and a processor 650 (e.g., processor 120 of FIG. 1).

According to an embodiment, the communication circuit 610 (e.g., communication module 190 of FIG. 1) may establish communication between the electronic device 101 and the electronic pen (e.g., electronic pen 310 of FIGS. 3 and 4). The communication circuit 610 may communicate with the communication circuit of the electronic pen 310 using at least one of various short-range wireless communication types. For example, the short-range wireless communication type (e.g., first network 198 of FIG. 1) may include Bluetooth low energy (BLE) communication, but is not limited thereto.

According to an embodiment, the memory 620 (e.g., memory 130 of FIG. 1) may store a designated condition (e.g., magnetic force value when the electronic pen 310 is mounted on the electronic device 101 and magnetic force value when the electronic pen 310 is detached from the electronic device 101). The stored designated condition may be used to detect whether the electronic pen 310 is detached from the pen seat part 320 of the electronic device 101 provided, for example, in at least a partial area of the rear plate (e.g., rear plate 211 of FIGS. 3 and 4) of the electronic device 101 to enable the electronic pen 310 to be mounted thereon. The memory 620 may store a program for controlling deactivation or activation of the communication circuit 610, such as, for example, the short-range wireless communication, based on the mounting of the electronic pen 310 on the electronic device 101 or the detachment of the electronic pen 310 from the electronic device 101. The memory 620 may store a program for executing a function corresponding to a control signal in accordance with an input of the electronic pen 310. The memory 620 may store a program for charging the battery of the electronic pen 310 depending on the mounting of the electronic pen 310 on the electronic device 101.

According to an embodiment, the sensor circuit 630 (e.g., sensor module 176 of FIG. 1) may detect whether the electronic pen 310 is detached from the electronic device 101. For example, the sensor circuit 630 may include a hall sensor for sensing a magnetic material. The hall sensor may be provided on a part of the pen seat part (e.g., pen seat part 320 of FIG. 4). The electronic pen 310 may be mounted on the pen seat part 320 using a magnetic force of a magnet, and may detect the mounting or detachment state of the electronic pen 310 based on the change value in magnetic force depending on the mounting or detachment of the electronic pen 310 on or from the pen seat part 320. The sensor circuit 630 may transfer a signal in accordance with the detected mounting or detachment of the electronic pen 310 to the processor 650.

According to an embodiment, the touchscreen display 640 (e.g., display device 160 of FIG. 1 or display 601 of FIG. 5) may be integrally configured to include a display 641, a touch panel 643, and a digitizer panel 645.

In an embodiment, the touchscreen display 640 may display an image under the control of the processor 650, and may be implemented by any one of a liquid crystal display (LCD), a light-emitting diode (LED) display, an organic light-emitting diode (OLED) display, a micro electromechanical system (MEMS) display, or an electronic paper display, but is not limited thereto.

In an embodiment, the display 641, under the control of the processor 650, may execute the function corresponding to the control signal in accordance with the input of the electronic pen 310, and may display a user interface for this. The display 641, under the control of the processor 650, may display a charging state (e.g., charging, expected time to complete the charging, charging completion) of the electronic pen 310. If the mounting of the electronic pen 310 on the electronic device 101 or the detachment of the electronic pen 310 from the electronic device 101 is detected, the display 641, under the control of the processor 650, may display information representing the mounting or detachment of the electronic pen 310.

In an embodiment, the touch panel 643 may receive, for example, a touch, gesture, proximity, or hovering input using a part of a user's body.

In an embodiment, the digitizer panel 645 (e.g., digitizer panel 570 of FIG. 5) may detect an input of the electronic pen 310. For example, the digitizer panel 645 may detect the location, slope, and/or pressure of the electronic pen 310 on the touchscreen display 640 based on a change of a physical amount being generated (e.g., change of the strength of the magnetic field that is detected by a conductive pattern implemented on the digitizer panel 645) as the electronic pen 310 approaches the touchscreen display 640.

According to an embodiment, the processor 650 (e.g., processor 120 of FIG. 1) may control the overall operation of the electronic device 101 and a signal flow between internal constituent elements of the electronic device 101, perform data processing, and control the battery to supply power to the constituent elements.

In an embodiment, if the detachment of the electronic pen 310 from the electronic device 101 is detected through the sensor circuit 630 (e.g., hall sensor), the processor 650 may control the digitizer panel 645 to be activated. The processor 650 may identify the state of the electronic pen 310 while executing communication between the electronic device 101 and the electronic pen 310 through the communication circuit 610. For example, the processor 650 may identify at least a strength of the signal transmitted from the electronic pen 310 or sensor information of the electronic pen 310. As another example, when the electronic device 101 receives the signal being transmitted from the electronic pen 310, the processor 650 may identify a strength of the signal received in the electronic device 101. The processor 650 may control the activated digitizer panel 645 to be deactivated based on the strength information of the signal transmitted from the electronic pen 310, the strength information of the signal received from the electronic pen 310, and/or the sensor information of the electronic pen 310. For example, if the distance between the electronic device 101 and the electronic pen 310 deviates from the designated range and/or the movement of the electronic pen 310 is not detected, the processor 650 may control the activated digitizer panel 645 to be deactivated based on the identified state of the electronic pen 310.

According to certain embodiments, although not illustrated in FIG. 6, the electronic device 101 may further include a wireless charging circuit (e.g., wireless charging circuit 325 of FIG. 4). The wireless charging circuit 325 may be disposed in the pen seat part 320 of the electronic device 101, and using this, it may charge the battery of the electronic pen 310.

Figure 7:
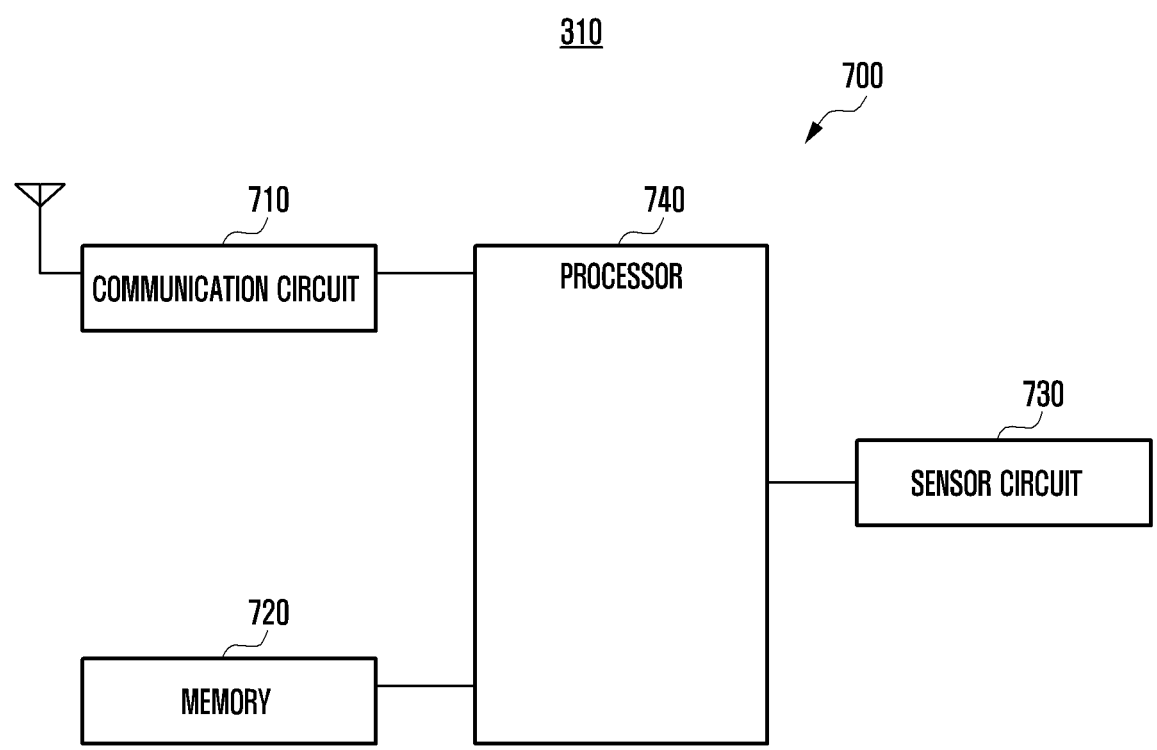
FIG. 7 is a block diagram illustrating an electronic pen according to certain embodiments.

FIG. 7 is a block diagram 700 illustrating an electronic pen 310 according to certain embodiments.

With reference to FIG. 7, the electronic pen 310 may include a communication circuit 710, a memory 720, a sensor circuit 730, and a processor 740.

In an embodiment, the communication circuit 710 may establish communication between the electronic pen 310 and the electronic device (e.g., electronic device 101 of FIG. 1). The communication circuit 710 may support the short-range wireless communication type. For example, the short-range wireless communication type may include the Bluetooth low energy (BLE) communication, but is not limited thereto.

In an embodiment, if movement of the electronic pen 310 is not detected for a designated time through the sensor circuit 730, the communication circuit 710, under the control of the processor 740, may be set to a deactivated state.

In an embodiment, the memory 720 may store a program for controlling the deactivation or activation of the communication circuit 710, for example, short-range wireless communication, based on the mounting or detachment of the electronic pen 310 on or from the electronic device 101, for example, the pen seat part (e.g., pen seat part 320 of FIG. 4) provided in at least a partial area of the rear plate (e.g., rear plate 211 of FIGS. 3 and 4) of the electronic device 101. The memory 720 may store a program for controlling the activation or deactivation of the communication circuit 710, for example, short-range wireless communication, based on whether the movement of the electronic pen 310 is detected for a designated time. The memory 720 may store a program for charging a battery (not illustrated) of the electronic pen 310 depending on that the electronic pen 310 is mounted on the electronic device 101.

In an embodiment, the sensor circuit 730 may obtain and transfer the sensor information of the electronic pen 310 to the processor 740. For example, the sensor circuit 730 may include a 6-axis sensor. The 6-axis sensor may be implemented as a 3-axis acceleration sensor and a 3-axis gyro sensor, but is not limited thereto. The sensor circuit 730, for example, the 6-axis sensor, may detect the location of the electronic pen 310, a posture change or posture variation of the electronic pen 310, 3D movement amount of the electronic pen 310, and/or 3D rotation amount of the electronic pen 310.

In an embodiment, the processor 740 may control the overall operation of the electronic pen 310, and a signal flow between internal constituent elements of the electronic pen 310.

In an embodiment, if the electronic pen 310 is detached from the electronic device 101, the processor 740 may activate the communication circuit 710, such as, for example, the short-range wireless communication circuit. The processor 740 may establish a communication channel with the electronic device 101 through the communication circuit 710. The processor 740 may transmit the sensor information of the electronic pen 310 obtained through the sensor circuit 730 to the electronic device 101 through the communication circuit 710.

In an embodiment, if the movement of the electronic pen 310 is not detected based on the sensor information of the electronic pen 310 obtained through the sensor circuit 730, the processor 740 may deactivate the communication circuit 710, such as, for example, the short-range wireless communication circuit. After a predetermined time elapses, if the movement of the electronic pen 310 is detected based on the sensor information of the electronic pen 310 obtained through the sensor circuit 730, the processor 740 may activate the communication circuit 710 of the deactivated state, for example, short-range wireless communication, and may transmit the sensor information of the electronic pen 310 to the electronic device 101.

According to certain embodiments, although not illustrated in FIG. 7, the electronic pen 310 may further include a battery. The electronic pen 310 may include a coil member for electromagnetic induction and/or wireless charging, and using the coil member, the battery (not illustrated) may be charged through a wireless charging circuit (e.g., wireless charging circuit 325 of FIG. 4) disposed in the pen seat part 320 of the electronic device 101.

Figure 8:
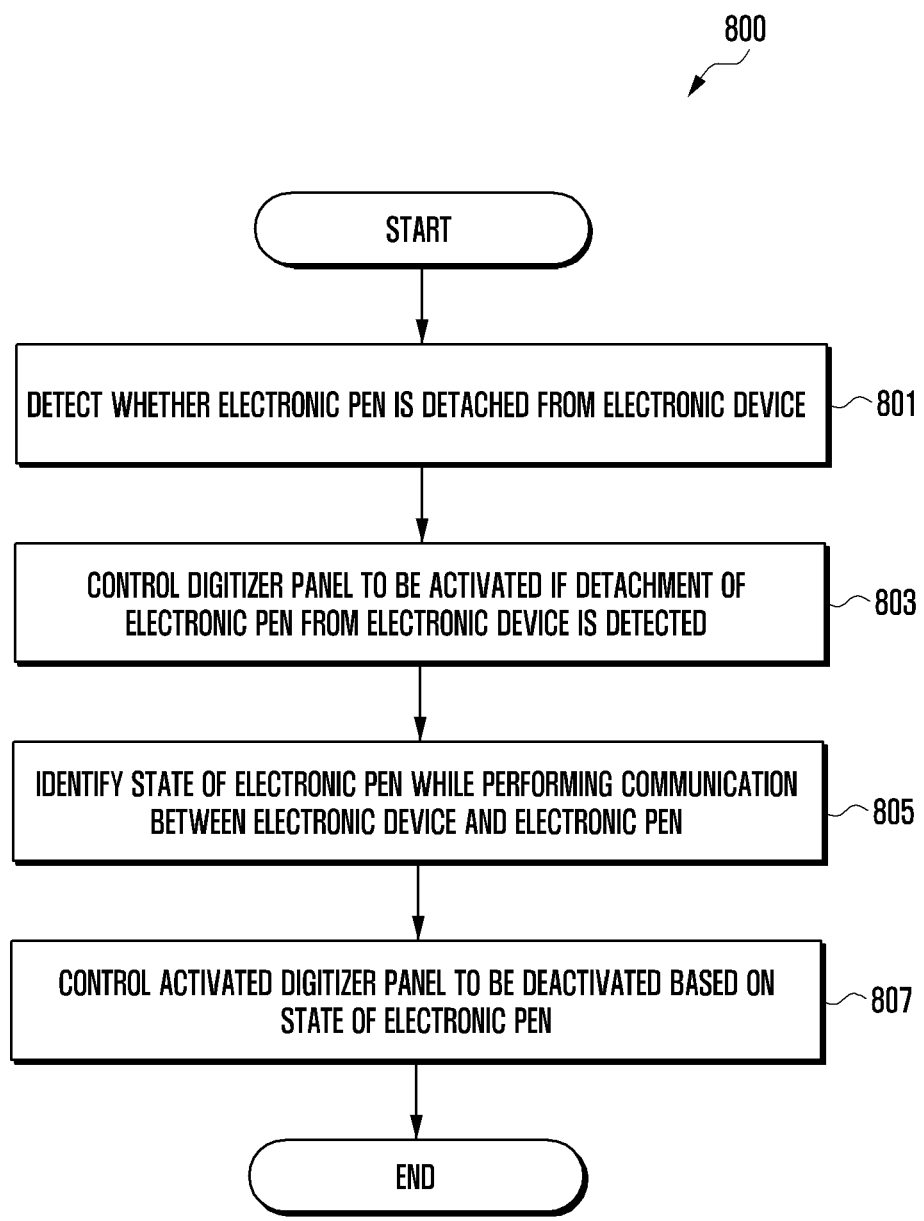
FIG. 8 is a flowchart explaining a method for controlling a digitizer panel of an electronic device according to certain embodiments.

FIG. 8 is a flowchart 800 explaining a method for controlling a digitizer panel 645 of an electronic device 101 according to certain embodiments.

With reference to FIG. 8, the electronic device 101, at operation 801, may detect whether the electronic pen (e.g., electronic pen 310 of FIGS. 3 and 4) is detached from the electronic device 101 using the sensor circuit (e.g., sensor circuit 630 of FIG. 6). For example, the sensor circuit 630 may include a hall sensor. The hall sensor may be provided in a partial area of the pen seat part (e.g., pen seat part 320 of FIG. 4) provided in at least a partial area of the rear plate (e.g., rear plate 211 of FIGS. 3 and 4) of the electronic device 101. The electronic device 101 may detect the mounting or detachment state of the electronic pen 310 through the hall sensor provided in the partial area of the pen seat part 320.

In an embodiment, if the detachment of the electronic pen 310 from the electronic device 101 is detected, the electronic device 101, at operation 803, may control the digitizer panel (e.g., digitizer panel 645 of FIG. 6) to be activated.

In an embodiment, the communication circuit (e.g., communication circuit 610 of FIG. 6) of the electronic device 101, for example, the short-range wireless communication circuit (e.g., Bluetooth low energy (BLE) communication), may be in the deactivated state. If the detachment of the electronic pen 310 from the electronic device 101 is detected, the electronic device 101 may control the short-range wireless communication circuit (e.g., Bluetooth low energy (BLE) communication) to be in the activated state.

In an embodiment, the electronic device 101, at operation 805, may identify the state information of the electronic pen 310 while performing (e.g., establishing and maintaining) the communication between the electronic device 101 and the electronic pen 310 through the communication circuit 610.

In an embodiment, a communication channel may be formed between the electronic device 101 and the electronic pen 310 through the communication circuit 610. The electronic device 101 may receive a control signal from the electronic pen 310 which is detached (e.g., separated) from the electronic device 101 through the communication circuit 610 (e.g., short-range wireless communication circuit). For example, the electronic device 101 may detect an input of the electronic pen 310 through the digitizer panel 645. The electronic device 101 may detect the location, slope, and/or pressure of the electronic pen 310 on the touchscreen display 640 based on the change of the physical amount (e.g., strength change of a magnetic field detected from a conductive pattern implemented on the digitizer panel 645) being generated as the electronic pen 310 approaches the touchscreen display (e.g., touch screen display 640 of FIG. 6) through the digitizer panel 645. The electronic device 101 may execute a function corresponding to the control signal in accordance with the detected location, slope, and/or pressure of the electronic pen 310 on the touchscreen display 640, and may display the user interface for this, but is not limited thereto. The electronic device 101 may receive, from the electronic pen 310, an input through a button (e.g., button 313 of FIGS. 3 and 4) provided on the electronic pen 310 and/or motion information detected through a 6-axis sensor provided in the electronic pen 310. The electronic device 101 may execute a corresponding function based on the received motion information, and may display the user interface for this.

In an embodiment, the electronic device 101 may identify the state of the electronic pen 310 at a designated time interval, when a predetermined time elapses after the detachment of the electronic pen 310 from the electronic device 101 is detected. For example, the electronic device 101 may identify at least one of strength information of the signal transmitted from the electronic pen 310, strength information of the received signal, or sensor information of the electronic pen 310.

In an embodiment, the electronic device 101, at operation 807, may control the activated digitizer panel 645 to be deactivated based on the state of the electronic pen 310. For example, the electronic device 101 may control the activated digitizer panel 645 to be deactivated based on the strength of a signal transmitted from the electronic pen 310, the strength of a signal received from the electronic pen 310, and/or sensor information of the electronic pen 310 (e.g., if the strength is sufficient weak as to be below a certain threshold strength, or indicative of another indicator below a threshold, such as distance).

In an embodiment, the electronic device 101 may analyze the state of the electronic pen 310, including, for example, the strength of the signal received from the electronic device 310 (received signal strength indicator (RSSI). The electronic device 101 may determine the distance from the electronic pen 310 based on the strength of the analyzed received signal. If it is determined that the determined distance between the electronic device 101 and the electronic pen 310 deviates from a designated range, the electronic device 101 may control the activated digitizer panel 645 to be deactivated. For example, the case where the distance from the electronic pen 310 deviates from the designated range may include a state where the strength of the received signal is weak, which may indicate a sufficient large distance between the electronic device 101 and the electronic pen 310 as signal strength generally degrades over distance.

Although not illustrated, if the determined distance between the electronic device 101 and the electronic pen 310 is included in the designated range, the electronic device 101 may control to maintain the activated state of the digitizer panel 645. For example, if the distance from the electronic pen 310 is included in the designated range, the strength of the received signal is strong, and thus the distance between the electronic device 101 and the electronic pen 310 is close.

In an embodiment, the electronic device 101 may determine whether the movement of the electronic pen 310 is detected for a designated time based on the sensor information of the electronic pen 310. If it is determined that the movement of the electronic pen 310 is not detected for the designated time based on the sensor information of the electronic pen 310, the electronic device 101 may control the activated digitizer panel 645 to be deactivated. For example, the case where the movement of the electronic pen 310 is not detected may include a state where a user places the electronic pen 310 on a table which may signal an intention to forego use of the electronic pen 310. As another example, the case where the movement of the electronic pen 310 is not detected may include a state where the Bluetooth low energy (BLE) signal ceases output, due to entry into a lower power mode in which the electronic pen 310 is not in use for a predetermined time, or a case where the communication circuit (e.g., communication circuit 710 of FIG. 7) is switched to a deactivated state since the distance deviates from the set range in which the communication is possible using Bluetooth.

Although not illustrated, if it is determined that the movement of the electronic pen 310 is detected based on the sensor information of the electronic pen 310, the electronic device 101 may control the digitizer panel 645 to maintain the activated state.

In certain embodiments of the disclosure, since the state of the digitizer panel 645 is controlled, for example, since the digitizer panel 645 is controlled to be deactivated based on not only the detachment of the electronic pen 310 from the electronic device 101 but also the distance between the electronic device 101 and the electronic pen 310, and/or whether the electronic pen 310 is moved, the usage time of the electronic device 101 can be increased by about 5 to 10% as compared with the usage time in the related art. For example, it is assumed that a moving image is reproduced. In the related art, in case that the activated state of the digitizer panel 645 is maintained while the moving image is reproduced, the usage time of the electronic device may be about 15 hours. According to certain embodiments of the disclosure, since the digitizer panel 645 is controlled to be in the deactivated state based on the detachment and the state of the electronic pen 310 while the moving image is reproduced, the usage time of the electronic device 101 is about 16 hours, and thus the usage time of the electronic device 101 can be increased by about one hour as compared with the usage time in the related art. Accordingly, the current consumption can be improved by about 5 to 15 mA.

Figure 9:
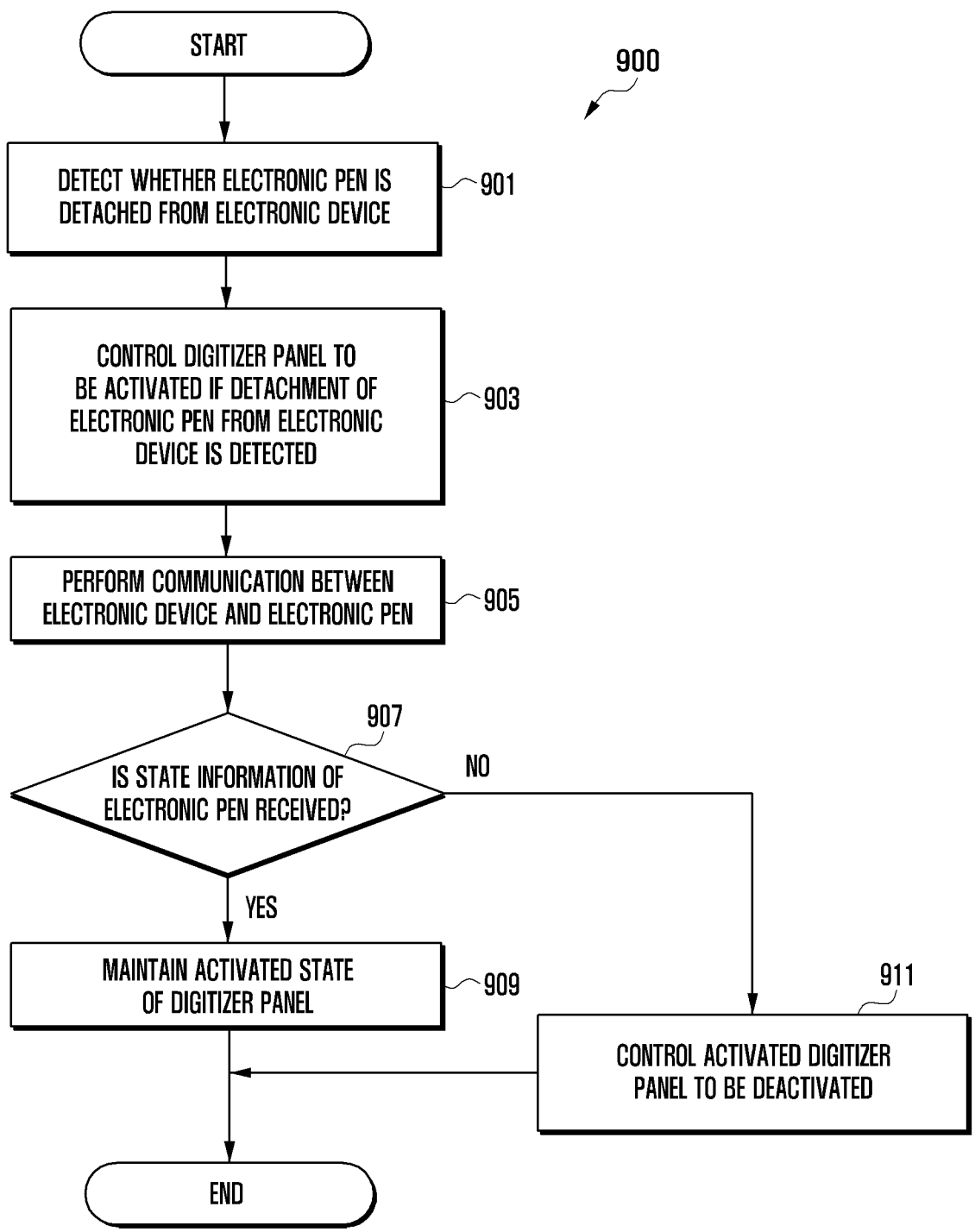
FIG. 9 is a flowchart explaining a method for controlling a digitizer panel of an electronic device according to certain embodiments.

FIG. 9 is a flowchart 900 explaining a method for controlling a digitizer panel 645 of an electronic device 101 according to certain embodiments.

According to an embodiment, since operations 901 to 905 are the same as operations 801 to 805 of FIG. 8 as described above, the detailed explanation thereof can be replaced by the explanation related to FIG. 8.

With reference to FIG. 9, the electronic device 101, at operation 901, may detect whether the electronic pen (e.g., electronic pen 310 of FIGS. 3 and 4) is detached from the electronic device 101. If the detachment of the electronic pen 310 from the electronic device 101 is detected, the electronic device 101, at operation 903, may control the digitizer panel (e.g., digitizer panel 645 of FIG. 6) to be activated. At operation 905, the electronic device 101 may perform (e.g., establish and then maintain) communication between the electronic device 101 and the electronic pen 310.

In an embodiment, the electronic device 101, at operation 907, may determine whether the state information of the electronic pen 310 is received from the electronic pen 310 while performing the communication between the electronic device 101 and the electronic pen 310. The state information of the electronic pen 310 may include at least one of the strength information of the signal transmitted from the electronic pen 310, the strength information of the signal received from the electronic pen 310, or the sensor information of the electronic pen 310.

In an embodiment, if the state information of the electronic pen 310 is received from the electronic pen 310, the electronic device 101, at operation 909, may maintain the activated state of the digitizer panel 645.

Although not illustrated, if the state information of the electronic pen 310 is received from the electronic pen 310 through the communication circuit (e.g., communication circuit 610 of FIG. 6), the electronic device 101 may further include analyzing the received state information of the electronic pen 310. For example, the electronic device 101 may identify the state information of the electronic pen 310, and in case the distance between the electronic device 101 and the electronic pen 310 is included within the designated range, and/or the movement of the electronic pen 310 is detected, the electronic device 101 may control the digitizer panel 645 to maintain activation. The electronic device 101 may identify the state information of the electronic pen 310, and in a case in which the distance between the electronic device 101 and the electronic pen 310 deviate from the designated range, and/or the if a movement of the electronic pen 310 is not detected for a threshold time, the electronic device 101 may control the activated digitizer panel 645 to be deactivated.

In an embodiment, in case that the state information of the electronic pen 310 is not received from the electronic pen 310, the electronic device 101, at operation 911, may control the activated digitizer panel 645 to be deactivated. For example, in a case in which the electronic pen 310 is not in use for a predetermined time, the communication circuit (e.g., communication circuit 710 of FIG. 7) of the electronic pen 310 may be switched to the deactivated state. As another example, in a case in which the electronic pen 310 is not in use for the predetermined time, the Bluetooth low energy (BLE) signal may cease to be output due to the low power mode. In case that the communication circuit 710 of the electronic pen 310 is deactivated, or the Bluetooth low energy signal is not output, the communication connection between the electronic device 101 and the electronic pen 310 may be released. In a case in which the communication connection with the electronic pen 310 is released, the electronic device 101 may be unable to receive the state information of the electronic pen 310 from the electronic pen 310. In this case, the electronic device 101 may determine that the electronic pen 310 is not in use, and may control the digitizer panel 645 to be deactivated.

In an embodiment, after the designated time elapses in a state where the state information of the electronic pen 310 is not received from the electronic pen 310, the electronic device 101 may receive the state information of the electronic pen 310 from the electronic pen 310. For example, in a case in which the button (e.g., button 313 of FIGS. 3 and 4) separately provided on the electronic pen 310 is input, and/or the movement of the electronic pen 310 is detected through the sensor circuit (e.g., sensor circuit 750 of FIG. 7), the electronic pen 310 may switch the communication circuit 710 from the deactivated state to the activated state. As the communication circuit 710 is activated, the communication channel between the electronic device 101 and the electronic pen 310 may be established. The electronic pen 310 may transmit the state information of the electronic pen 310 to the electronic device 101 through the active communication channel. The electronic device 101 may identify the state information of the electronic pen 310, being received from the electronic pen 310, and based on this, may control the digitizer panel 645 of the deactivated state to be activated.

In certain embodiments of the disclosure, since the digitizer panel 645 is deactivated based on not only whether the electronic pen 310 is detached from the electronic device 101, but also whether the state information of the electronic pen 310 is received from the electronic pen 310, the usage time of the electronic device 101 can be increased as compared to other, inferior solutions.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
 a communication circuit;
 a sensor circuit;
 a digitizer panel; and a processor operatively connected to the communication circuit, the sensor circuit, and the digitizer panel, wherein the processor is configured to:
detect whether an electronic pen is detached from the electronic device via the sensor circuit,
activate the digitizer panel based on detecting detachment of the electronic pen from the electronic device,
identify a state of the electronic pen through a communication linkage with the electronic pen via the communication circuit,
while the electronic pen remains detached from the electronic device, deactivate the activated digitizer panel based on the identified state of the electronic pen,
identify a distance to the electronic pen based on a strength of a communication signal with the electronic pen,
identify whether a movement of the electronic pen is detected for a designated time based on sensor information received from the electronic pen, and
deactivate the activated digitizer panel in case that the identified distance is greater than a predefined threshold distance and the movement of the electronic pen is not detected for the designated time.

2. The electronic device of claim 1, wherein the state of the electronic is detected while maintaining the communication linkage with the electronic pen, and
wherein the identified state includes at least one of the strength of the communication signal with the electronic pen, or the sensor information received from the electronic pen.

3. The electronic device of claim 2, wherein the processor is configured to:
maintain activation of the digitizer panel based on detecting that the identified distance is disposed within the predefined threshold distance.

4. The electronic device of claim 2, wherein the processor is configured to:
maintain the activation of the digitizer panel based on detecting the movement of the electronic pen via the received sensor information.

5. The electronic device of claim 1, wherein, when the communication circuit is deactivated and the electronic pen is attached, the processor is further configured to:
based on detecting detachment of the electronic pen, activate the communication circuit.

6. The electronic device of claim 1, wherein the processor is configured to:
identify whether the state of the electronic pen is received from the electronic pen via the communication linkage; and
deactivate the digitizer panel when the state of the electronic pen is not received.

7. The electronic device of claim 6, wherein the processor is configured to:
identify the state of the electronic pen based on receiving a transmission of the state from the electronic pen via the communication circuit.

8. The electronic device of claim 6, wherein the processor is configured to:
activate the digitizer panel when the state is received from the electronic pen via the communication circuit after lapse of a predesignated time period starting from when the digitizer panel is deactivated.

9. A method of an electronic device, the method comprising:
detecting whether an electronic pen is detached from the electronic device via a sensor circuit;
activating, by at least one processor, a digitizer panel based on detecting detachment of the electronic pen from the electronic device;
identifying a state of the electronic pen while maintaining a communication linkage with the electronic pen via a communication circuit; and
while the electronic pen remains detached from the electronic device, deactivating the activated digitizer panel based on the identified state of the electronic pen,
wherein deactivating the activated digitizer panel comprises:
identifying a distance to the electronic pen based on a strength of a communication signal with the electronic pen,
identifying whether a movement of the electronic pen is detected for a designated time based on sensor information received from the electronic pen; and
deactivating the activated digitizer panel in case that the identified distance is greater than a predefined threshold distance and the movement of the electronic pen is not detected for the designated time.

10. The method of claim 9, wherein the identified state of the electronic pen includes at least one of the strength of the communication signal with the electronic pen, or the sensor information of the electronic pen.

11. The method of claim 10, wherein deactivate the activated digitizer panel further includes:
maintaining activation of the digitizer panel based on detecting that the identified distance is disposed within the predefined threshold distance.

12. The method of claim 10, wherein deactivate the activated digitizer panel further includes:
maintaining the activation of the digitizer panel based on detecting the movement of the electronic pen via the received sensor information.

13. The method of claim 9, further comprising:
when the communication circuit is deactivated and the electronic pen is attached, based on detecting detachment of the electronic pen, activating the communication circuit.

14. The method of claim 9, further comprising:
identifying whether the state of the electronic pen is received from the electronic pen through the communication linkage via the communication circuit.

15. The method of claim 14, further comprising: deactivate the digitizer panel when the state of the electronic pen is not received through the communicate linkage.

* * * * *